United States Patent
Tang

(10) Patent No.: US 7,466,366 B2
(45) Date of Patent: Dec. 16, 2008

(54) TV TUNER PROVIDING FM RADIO RECEPTION

(75) Inventor: Chee Hun Tang, Kuala Lumpur (MY)

(73) Assignee: Sony EMCS (Malaysia) SDN, BHD., Kuala Lumpur (MY)

( * ) Notice: Subject to any disclaimer, the term of this patent is extended or adjusted under 35 U.S.C. 154(b) by 632 days.

(21) Appl. No.: 11/238,540

(22) Filed: Sep. 29, 2005

(65) Prior Publication Data

US 2006/0158569 A1 Jul. 20, 2006

(30) Foreign Application Priority Data

Jan. 20, 2005  (MY) ............................... PI 20050237

(51) Int. Cl.
*H04N 5/46* (2006.01)
*H04N 5/455* (2006.01)

(52) U.S. Cl. ..................... 348/729; 348/726; 348/731

(58) Field of Classification Search ................. 348/729, 348/725, 726, 731–733, 738, 737; *H04N 5/44, H04N 5/50, 5/46, 5/455*
See application file for complete search history.

(56) References Cited

U.S. PATENT DOCUMENTS

| 5,710,993 | A  | * | 1/1998 | Brekelmans | ................ 348/729 |
| 6,683,656 | B1 | * | 1/2004 | Kikuchi | ...................... 348/729 |
| 7,227,591 | B2 | * | 6/2007 | Hwang et al. | ............... 348/729 |

\* cited by examiner

*Primary Examiner*—Sherrie Hsia
(74) *Attorney, Agent, or Firm*—Frommer Lawrence & Haug LLP; William S. Frommer

(57) ABSTRACT

A TV receiver capable of producing audio output from an FM radio signal substitutes an oscillator (217) and mixer (218) with an output at the sound intercarrier frequency for the normal TV receiver split or quasi-split sound output (212) on FM radio signals only.

10 Claims, 3 Drawing Sheets

205 = PROGRAMMABLE REFERENCE DIVIDER
206 = PROGRAMMABLE PLL DIVIDER / COMPARATOR

TV TUNER PROVIDING FM RADIO RECEPTION

TECHNICAL FIELD

The invention generally relates to the reception of FM radio signals on a TV tuner.

More particularly the invention relates to the reception of FM radio signals using the audio portion of a TV receiver and the TV tuner.

BACKGROUND ART

It is known to make use of functional parts of a TV receiver to also receive FM radio signals, thereby allowing some commonality which reduces costs. Thus, for instance U.S. Pat. No. 6,633,345 B2 uses the same continuously tuneable TV tuner for both FM radio and TV audio by synthesising a sound subcarrier for the FM radio signals and using the normal TV demodulator.

U.S. patent application 2004/0088725 A1, by contrast, proposes either separate tuners for TV and FM but uses the same audio demodulator or extracts an FM radio signal from the tuner and provides, in an unexplained manner, the correct frequency to convert this to match the standard TV demodulator.

Such proposals fail to meet the requirements for easy production of the required output, firstly because the frequency separation of TV channels, which is programmed into the TV tuner, is not the same as the frequency separation of FM radio channels and secondly because the FM signal requires the generation of a picture frequency carrier if the same audio modules are to be used. Thus a TV tuner may have steps of 62.5 kHz while FM radio channels are normally 50 kHz apart. This provides difficulty in tuning accurately across the FM radio frequency band. Insertion of a picture carrier frequency to provide for use with the standard TV audio demodulator is also problematic without any picture frequencies. Existing methods of tuning FM radio signals therefore tend to spread the intermediate FM signals produced across the pass band of a TV tuner and can easily produce adjacent channel interference problems which are difficult to solve and require added componentry.

The present invention aims to provide a solution to this and other problems which offers advantages over the prior art.

SUMMARY OF THE INVENTION

In one exemplification the invention relates to a TV receiver capable of receiving both TV signals and FM radio signals on differing bands and providing audio output from both wherein the receiver has:
  a tuner capable of tuning to both TV and FM radio signal bands,
  an intermediate frequency (IF) filter for a TV signal,
  a split or quasi-split sound (QSS) intercarrier demodulator, and
  an FM demodulator for the signal from the sound intercarrier demodulator,
  an oscillator and mixer capable of substituting for the split or QSS sound signal demodulator when an FM radio signal is to be demodulated, the oscillator and mixer creating from an FM radio signal converted to a TV IF signal a signal capable of demodulation by the FM demodulator.

Preferably the TV tuner is a phase locked loop (PLL) tuner restrained to valid channel frequency spacings.

Preferably the tuner is restrained to valid channel frequency spacings on both TV and FM radio frequency bands.

Preferably the oscillator and mixer output is at the intercarrier sound frequency.

Preferably the signals are substituted by switching.

In an embodiment, the PLL tuner includes a programmable reference divider that receives a reference frequency and has a division ratio adjustable according to channel spacing, and a programmable PLL divider/comparator responsive to an output of the programmable reference divider and to tuning data, the programmable PLL divider/comparator having an output for controlling a mixer oscillator and an input for receiving a sample of the mixer oscillator output.

In a further exemplification the invention consists in a method of receiving FM radio signals on a TV receiver by:
  tuning a TV tuner to both TV and FM radio bands,
  extracting the FM radio signal from the intermediate frequency output of the tuner,
  converting the output to the TV intercarrier frequency, and
  demodulating the converted output in the TV sound FM demodulator.

Preferably the TV tuner can be tuned to only valid channel frequencies.

Preferably the channel spacing is varied for FM radio reception.

Preferably the input of the TV sound FM demodulator can be switched to the extracted converted output when the TV tuner is tuned to FM radio frequencies.

These and other features of as well as advantages which characterise the present invention will be apparent upon reading of the following detailed description and review of the associated drawings.

DETAILED DESCRIPTION

Figure 1:
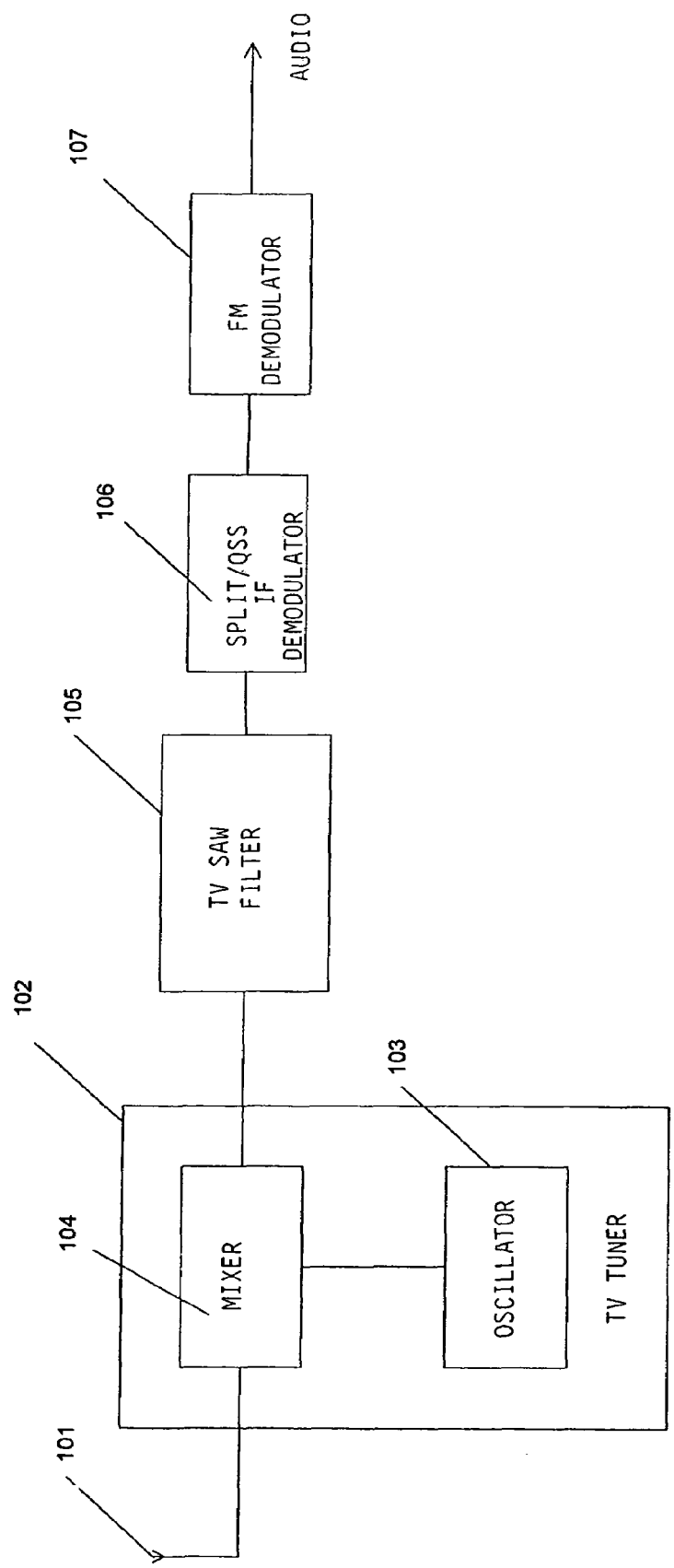
FIG. 1 is a general block diagram of a known TV receiver.

Referring now to FIG. 1 a known method of producing TV audio output is shown. The system includes an antenna 101 feeding a TV tuner generally shown at 102 and containing a first oscillator 103 and a mixer 104. The output is applied to a TV SAW (Surface Acoustic Wave) filter 105 which selects the picture carrier and image frequencies as well as the sound intercarrier and sound frequencies, the picture carrier being centred at typically 38.9 MHz (or 38 MHz) and the sound intercarrier at 33.40 MHz (or 32.5 MHz). The sound intercarrier and sound frequencies are selected in the split or quasi-split sound (QSS) IF demodulator 106 and the resulting 5.5 MHz sound signal passed to FM demodulator 107 for output to an audio amplifier. The TV tuner 102 may be continuously tunable over the whole of the consumer TV frequencies and may include a phase locked oscillator which is locked to a frequency divided reference. Typically only frequencies at spacings of 31.25 kHz and 62.5 kHz are provided for since these are the nominal spacings of TV channels.

Figure 2:
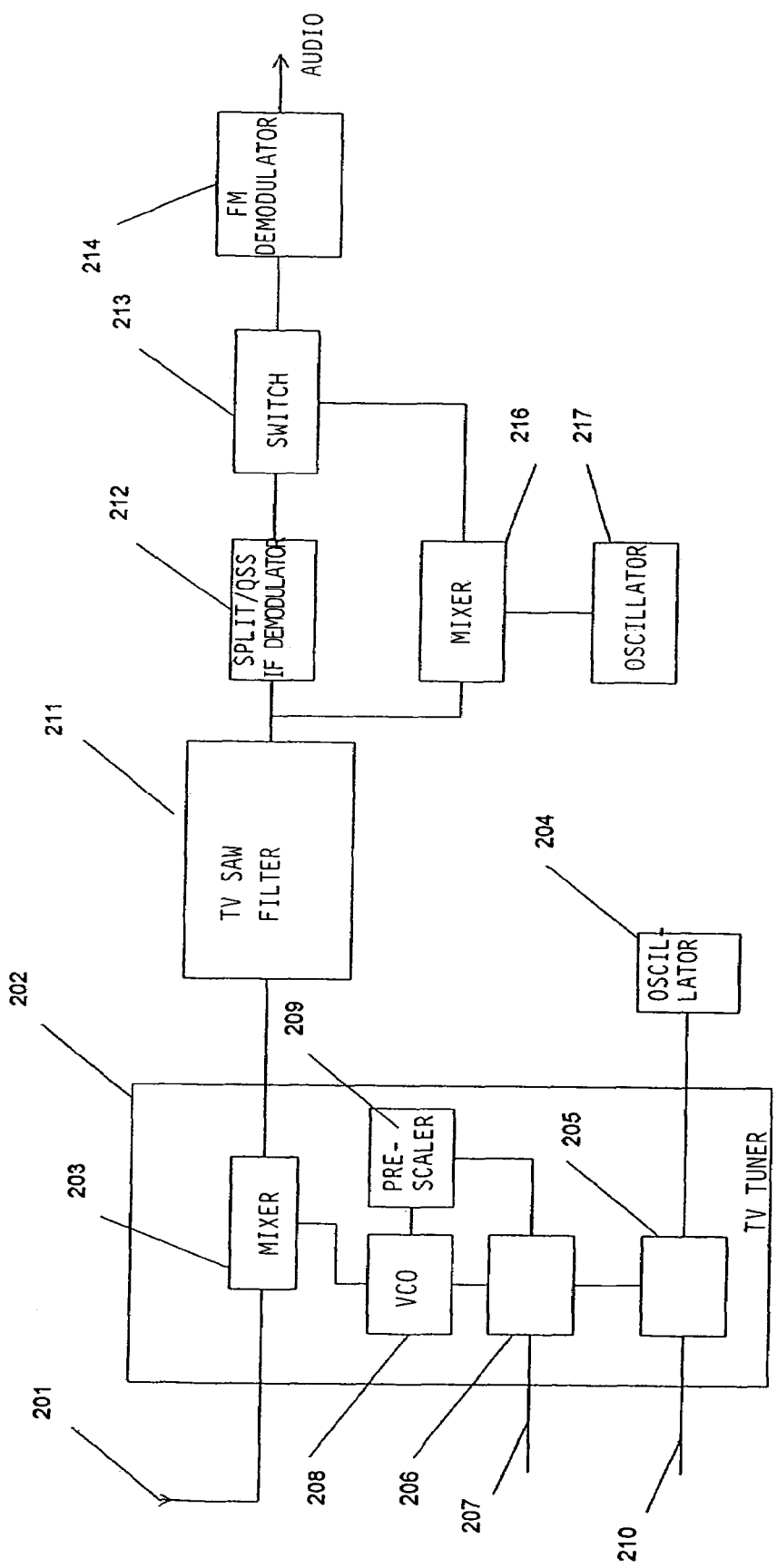
FIG. 2 is a block diagram of a circuit modified to also output FM radio audio in accordance with an embodiment of the invention.

FIG. 2 shows the required adaptation of the circuit so that it is also capable of outputting FM radio sound. An antenna 201 is connected to a TV tuner generally shown at 202 and containing a mixer 203 supplied from a first oscillator 208. The first oscillator 208 is regulated from programmable phase lock loop (PLL) divider and comparator 206 whose frequency is controlled by input at 207 and feedback through prescaler 209. The divider and comparator is tunable only to steps set by programmable reference divider 205 which is fed from reference oscillator 204. The division ratio of the divider may be controlled at 210 by a mode switching signal and may be set so that at various frequency ranges of the PLL it may provide 31.25 kHz spacing, 62.5 kHz spacing or 50 kHz spacing. Typically radio FM channels are set to a spacing of 50 kHz.

By way of example only, in a design using a crystal oscillator 204 of 4 MHz and a ⅛ prescaler 209, the programmable reference divider 205 is set as shown in Table 1 below to meet the required tuning steps.

TABLE 1

| Tuning Step | 31.25 kHz | 62.5 kHz | 50 kHz |
|---|---|---|---|
| Division Ratio | 1024 | 512 | 640 |

Based on the above example and an IF frequency of 38 MHz, to tune an FM radio frequency of 99.15 MHz, the programmable reference divider 205 is set to 640 while the programmable PLL divider/comparator 206 is set to 2633.

FM radio tuning operation is done using a self-defined channel table, as shown in Table 2 below.

TABLE 2

| FM Radio Channel Allocation Map | Actual Tuned Frequency | FM Radio PLL Data VIF = 38 MHz & SIF = 32.5 MHz | Oscillator 208 Frequency MHz |
|---|---|---|---|
| 0 | 87.50 MHz | 2400 | 120.00 |
| 1 | 87.55 MHz | 2401 | 120.05 |
| 2 | 88.00 MHz | 2402 | 120.10 |
| . | . | . | . |
| . | . | . | . |
| . | . | . | . |
| 409 | 107.95 MHz | 2809 | 140.45 |
| 410 | 108.00 MHz | 2810 | 140.50 |

The output of the tuner is directed through a standard SAW filter 211 to both a split or QSS demodulator 212 and an audio signal mixer 216. Standard TV audio signals at 5.5 MHz are directed through audio mode switch 213 to FM demodulator 214 and thence to an audio output. For FM radio output the switch is set to take the output of mixer 216 this being supplied with a fixed frequency of 38.9 MHz from second oscillator 217 to produce the 5.5 MHz sound signal when working with a 33.40 MHz sound signal from the tuner.

In use the frequency bands through which the tuner is tuned will control the setting of the mode switch 210, with audio mode switch 213 being set to output from the FM radio signal when the mode switch is set to the 50 kHz spacing. Thus, where the frequency tuned to is between 88 and 109 MHz, the tuner will automatically switch to a 50 kHz spacing and switch 213 will be enabled. In other cases the TV modes are enabled.

While the frequencies referred to are representative of the European/PAL standards with a sound carrier offset of 5.5 MHz, other frequencies may be substituted for these without altering the action of the circuit.

Figure 3:
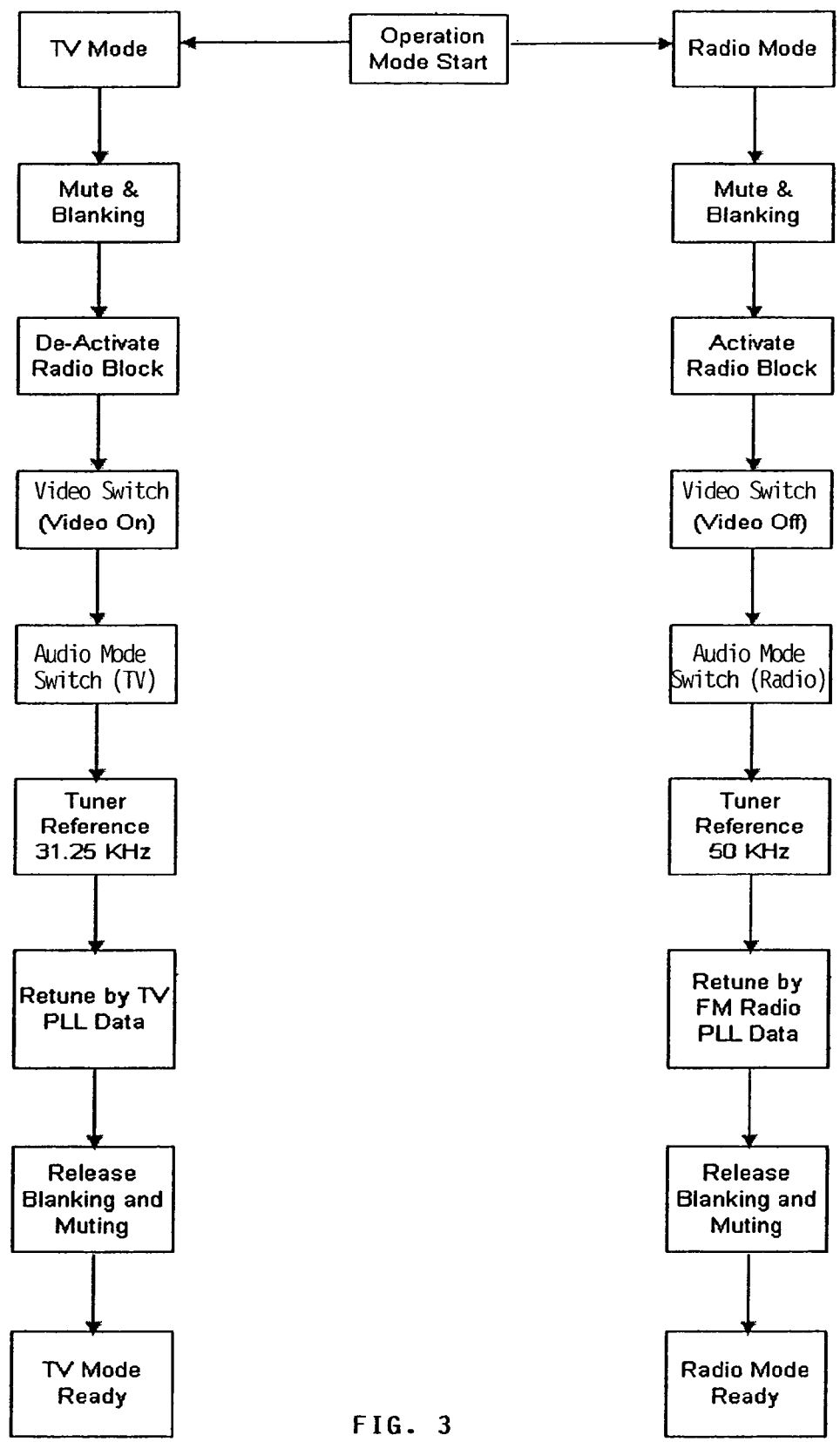
FIG. 3 is a flowchart that illustrates a sequence of control steps for establishing normal TV mode and FM radio mode.

A video output of SAW filter 211 is supplied to a video IF/demodulator stage and the demodulated video signal is output through a video switch (not shown). The video switch will be turned off during FM radio operation. This can be seen in FIG. 3, which is a flowchart of a typical sequence of control steps for establishing normal TV mode and FM radio mode.

The on-screen display (OSD) function of the TV receiver can be usefully employed to display data accompanying the radio signal, such as programme information transmitted under the RDS (Radio Data System) standard.

Thus, it will be seen that the embodiment operates by varying the step frequencies of the TV tuner when tuning FM radio signals and additionally substituting for the split or quasi-split sound (QSS) stage of a TV receiver a stage that extracts the FM radio signal for demodulation in the existing TV audio demodulator. An evident advantage of this arrangement is that the added functionality of FM radio reception can be achieved without substantial increase in component count, cost or required circuit board space.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the TV and FM radio audio output may vary dependent on the particular application for which it is used without departure from the scope of the present invention.

In addition, although the preferred embodiments described herein are directed to a TV tuner which is for use in a PLL system, it will be appreciated by those skilled in the art that the teachings of the present invention can be applied to other systems such as a fully software system, without departing from the scope of the present invention.

The integrated FM radio signal demodulator of the invention is used in TV receivers which are employed in the domestic and industrial environment. The present invention is therefore industrially applicable.

The invention claimed is:

1. A TV receiver capable of receiving both TV signals and FM radio signals on differing bands and providing audio output from both wherein the receiver has:
   a tuner (202) capable of tuning to both TV and FM radio signal bands,
   an intermediate frequency (IF) filter (211) for a TV signal,
   a split or quasi-split sound (QSS) intercarrier demodulator (212),
   an FM demodulator (214) for the signal from the sound intercarrier demodulator,
   an oscillator (217) and mixer (216) capable of substituting for the split or QSS sound signal demodulator when an FM radio signal is to be demodulated, the oscillator and mixer creating from an FM radio signal converted to a TV IF signal, a signal capable of demodulation by the FM demodulator (214).

2. A TV receiver as claimed in claim 1 wherein the TV tuner (202) is a phase locked loop (PLL) tuner restrained to valid channel frequency spacings.

3. A TV receiver as claimed in claim 2 wherein the tuner (202) is restrained to valid channel frequency spacings on both TV and FM radio frequency bands.

4. A TV receiver as claimed in claim 2 wherein said PLL tuner (202) includes a programmable reference divider (205) that receives a reference frequency and has a division ratio adjustable according to channel spacing, and a programmable PLL divider/comparator (206) responsive to an output of said programmable reference divider (205) and to tuning data, said programmable PLL divider/comparator (206) having an FM radio signal for controlling a mixer oscillator (208) and an input for receiving a sample of the mixer oscillator output.

5. A TV receiver as claimed in claim 1 wherein the oscillator and mixer output is at the intercarrier sound frequency.

6. A TV receiver as claimed in claim 5 wherein signals are substituted by switching.

7. A method of receiving FM radio signals on a TV receiver by:
   tuning a TV tuner (202) to both TV and FM radio bands,
   extracting the FM radio signal from the intermediate frequency output of the tuner,
   converting the FM radio signal to a TV intercarrier frequency, and
   demodulating the converted output in a TV sound FM demodulator.

8. The method of claim 7 comprising tuning the TV tuner (202) to only valid channel frequencies.

9. The method of claim 8 wherein channel spacing is varied for FM radio reception.

10. The method of claim 8 comprising switching the input of the TV sound FM demodulator (214) to the extracted converted output when the TV tuner is tuned to FM radio frequencies.

* * * * *